United States Patent
Ben-Ezra et al.

(10) Patent No.: US 11,592,557 B2
(45) Date of Patent: Feb. 28, 2023

(54) SYSTEM AND METHOD FOR FUSING INFORMATION OF A CAPTURED ENVIRONMENT

(71) Applicant: OSR ENTERPRISES AG, Cham (CH)

(72) Inventors: Yosef Ben-Ezra, Petah Tikva (IL); Samuel Hazak, Holon (IL); Yaniv Ben-Haim, Kfar Mordechai (IL); Yoni Schiff, Yahud (IL); Shai Nissim, Tel Aviv (IL)

(73) Assignee: OSR ENTERPRISES AG, Cham (CH)

( * ) Notice: Subject to any disclaimer, the term of this patent is extended or adjusted under 35 U.S.C. 154(b) by 329 days.

(21) Appl. No.: 16/765,869

(22) PCT Filed: Jun. 1, 2017

(86) PCT No.: PCT/IL2017/050611
§ 371 (c)(1),
(2) Date: May 21, 2020

(87) PCT Pub. No.: WO2018/220609
PCT Pub. Date: Dec. 6, 2018

(65) Prior Publication Data
US 2020/0364847 A1    Nov. 19, 2020

(51) Int. Cl.
*G06K 9/00* (2022.01)
*G01S 17/10* (2020.01)
(Continued)

(52) U.S. Cl.
CPC .............. *G01S 17/10* (2013.01); *G01S 17/89* (2013.01); *G06T 7/0002* (2013.01); *G06T 7/74* (2017.01);
(Continued)

(58) Field of Classification Search
None
See application file for complete search history.

(56) References Cited

U.S. PATENT DOCUMENTS

| 6,574,269 B1 | 6/2003 | Bergamo |
| 2010/0123569 A1 | 5/2010 | Okada et al. |

(Continued)

FOREIGN PATENT DOCUMENTS

EP    3171241    5/2017

OTHER PUBLICATIONS

ISR and IPRP for PCT/IL2017/050611.
(Continued)

*Primary Examiner* — Soo Jin Park
(74) *Attorney, Agent, or Firm* — Pearl Cohn Zedek Latzer Baratz LLP

(57) ABSTRACT

A method, apparatus and computer program product for fusing information, to be performed by a device comprising a processor and a memory device, the method comprising: receiving one or more distance readings related to the environment from a Lidar device emitting light in a predetermined wavelength; receiving an image captured by a multi spectra camera, the multi spectra camera being sensitive at least to visible light and to the predetermined wavelength; identifying within the image points or areas having the predetermined wavelength; identifying one or more objects within the image; identifying correspondence between each of the light points or areas and one of the readings; associating the object with a distance, based on the reading and points or areas within the object; and outputting indication of the object and the distance associated with the at least one object.

18 Claims, 4 Drawing Sheets

(51) Int. Cl.
    *G06T 7/73*       (2017.01)
    *G01S 17/89*      (2020.01)
    *G06T 7/00*       (2017.01)

(52) U.S. Cl.
    CPC ............ *G06T 2207/10036* (2013.01); *G06T 2207/20221* (2013.01); *G06T 2207/30261* (2013.01)

(56) References Cited

U.S. PATENT DOCUMENTS

| | | | | |
|---|---|---|---|---|
| 2015/0131080 | A1* | 5/2015 | Retterath | G01S 7/4815 356/5.01 |
| 2016/0325779 | A1* | 11/2016 | Zwicky | B60W 50/14 |
| 2017/0078884 | A1 | 3/2017 | Tanabe et al. | |
| 2017/0131718 | A1* | 5/2017 | Matsumura | A01B 69/008 |
| 2020/0096613 | A1* | 3/2020 | Li | G01S 17/10 |

OTHER PUBLICATIONS

European Search Report for Application No. EP 17909397, dated Jun. 2, 2021.
Supplementary European Search Report for Application No. EP 18854837, dated Jul. 23. 2021.
M Johnson et al: "Semantic Photo Synthesis"; computer graphics forum, Sep. 1, 2006. Abstract available.
Pomerleau Dean A: ALVINN: An autonomous Land Vehicle in a Neural Network; Jan. 1, 1989; Carnegie Mellon University, Pittsburgh, PA, USA.
Swati Agarwal et al: Content Based Image Retrieval using Discrete Wavelet Transform and Edge Histogram Descriptor; Information Systems and Computer Networks, 2013 Conference on IEEE; Mar. 9, 2013.
Jiang Lu et al: "Zero-Shot Learning by Generating Pseudo Feature Representations" Arxiv. Org, Cornell University Ithaca, NY 14853; dated Mar. 19, 2017.

* cited by examiner

SYSTEM AND METHOD FOR FUSING INFORMATION OF A CAPTURED ENVIRONMENT

TECHNICAL FIELD

The present disclosure relates to fusing information related to an environment from two sources in general, and to using the information in a car, in particular.

BACKGROUND

Most modern cars come installed with cameras, and in particular cameras installed on the dashboard and thus referred to as dash cams. These cameras are mostly used for capturing the surrounding of the car from within the car. Additional cameras are sometimes used for capturing areas not easily seen by the driver, such as areas behind or to the side of the car.

The images captured by the cameras are often stored but not used, unless a specific need for display arises, since the captured objects are also seen by the driver in real-time, thus giving the views as captured by the cameras little added value.

Fusing information may prove useful. One such usage is displaying the image with the information to a person, such as the driver. Another usage relates to operating driving or driving-assisting systems, such as advanced driver assistant systems (ADAS), whether such systems are part of an autonomous car or are used to provide safety and convenience features in regular cars.

BRIEF SUMMARY

One exemplary embodiment of the disclosed subject matter is a computer-implemented method for fusing information, to be performed by as device comprising a processor and a memory device, the method comprising: receiving one or more distance readings related to the environment from a Lidar device emitting light in a predetermined wavelength; receiving an image captured by a multi spectra camera, the multi spectra camera being sensitive at least to visible light and to the predetermined wavelength; identifying within the image points or areas having the predetermined wavelength; identifying one or more objects within the image; identifying correspondence between one or more of the light points or areas and one of the readings; associating the object with a distance, based on the reading and points or areas within the object; and outputting indication of the object and the distance associated with the object. The method can further comprise designing a display displaying the object and the distance, wherein said outputting comprises displaying on a display device. The method can further comprise displaying the image and the distance associated with the object, wherein the distance is displayed in the vicinity of the object on the display device. Within the method, designing optionally comprises determining an object for which a distance is to be displayed. Within the method, designing optionally comprises determining graphic characteristics for the display. The method can further comprise determining a command to be provided to a system, based on the object and distance. The method is optionally implemented within a vehicle, and the command is optionally provided to a critical system of the vehicle. Within the method, associating object with a distance optionally comprises associating the object with a distance selected from a multiplicity of distances received from the Lidar. Within the method, the distance is optionally selected as a minimal distance from the multiplicity of distances. Within the method, the distance is optionally selected as an average of the multiplicity of distances.

Another exemplary embodiment of the disclosed subject matter is an apparatus for enhancing view of an environment, the apparatus comprising: a Lidar device emitting light in a predetermined wavelength; a multi spectra camera, the multi spectra camera being sensitive at least to visible light and to the predetermined wavelength; and a processor adapted to perform the steps of: receiving one or more distances reading related to the environment from a Lidar device emitting light in a predetermined wavelength; receiving an image captured by the multi spectra camera; identifying within the image points or areas having the predetermined wavelength; identifying one or more objects within the image; identifying correspondence between one of the points or areas and one of the distance readings; associating the an object with a distance, based on the one reading and points or areas within the object; and outputting indication of the object and the distance associated with the object. The apparatus can further comprise a display device for displaying the image with the distance. Within the apparatus, the processor is optionally further adapted to design a display of the image with the distance to be displayed on the display device. Within the apparatus, the apparatus is optionally within a vehicle, and the vehicle optionally further comprises a controller for receiving the objects and the distance and determining a command to be provided to a system within the vehicle, based on the object and distance. Within the apparatus, the object and the distance are optionally provided to the system over CANBUS. Within the apparatus, the command is optionally provided to a brakes system or to an engine of the vehicle. Within the apparatus, the Lidar device optionally emits light in a near infra-red wavelength. Within the apparatus, the Lidar device optionally comprises a single light source creating light points on the image. Within the apparatus, the Lidar device optionally comprises two light sources, creating light spots on the image.

Yet another exemplary embodiment of the disclosed subject matter is a computer program product comprising a non-transitory computer readable storage medium retaining program instructions configured to cause a processor to perform actions, which program instructions implement: receiving one or more distance reading related to the environment from a Lidar device emitting light in a predetermined wavelength; receiving an image captured by a multi spectra camera, the multi spectra camera being sensitive at least to visible light and to the predetermined wavelength; identifying within the image points or areas having the predetermined wavelength; identifying one or more objects within the image; identifying correspondence between at least one of the light points or areas and the reading; associating the object with a distance, based on the reading and points or areas within the object; and outputting the object and the distance associated with the object.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
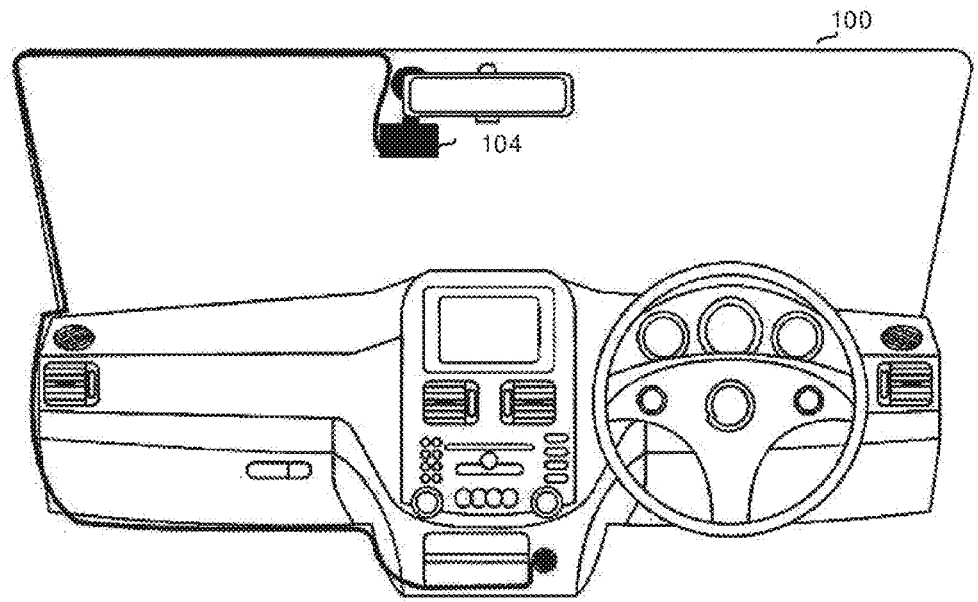
FIG. 1 is a schematic illustration of a car dash board with a dash cam.

Dash cams are commonly used and installed in many cars. Dash cams capture the environment as seen from the dash board, which is relatively close to the point of view of the driver, therefore, there is little need to represent the captured view.

Multi-spectral capturing is a technology that is gaining popularity and becoming more and more affordable. A multi spectral camera is a camera that captures one or more bands of visible light and at least one invisible wavelength band across the electromagnetic spectrum. The wavelengths are separated by filters or other components that are sensitive to a particular wavelength. The term multi-spectral camera as used herein also includes hyper-spectral cameras, which typically capture visible wavelengths and a larger number, for example at least five, of narrow wavelength ranges.

Thus, a multi spectral camera as used in the disclosure provides images having features in visible wavelengths and in at least one invisible wavelength or wavelength range.

Common wavelengths captured by multi spectral cameras belong to the following ranges:

Visible blue (450-510 nanometers);
Visible Green (530-590 nanometers);
Visible Red (640-670 nanometers);
Red-Edge (705-745 nanometers);
Near Infrared 1 (760-900 nanometers);
Near Infrared 2 (860-1040 nanometers);
Short-wave Infrared 1 (1570-1650 nanometers);
Short-wave Infrared 2 (2080-2350 nanometers); and
Thermal Infrared (10600-12510 nanometers);

Another known technology relates to a Light Detection and Ranging (Lidar) device for remote sensing of distances, that uses pulsed laser to measure distances from the Lidar to objects, locations or surfaces in one or more directions. The Lidar technology comprises illuminating in one or more directions with light emitted by one or more light sources, and using the reflected light for determining the distance between the light source and a target present in the illuminated direction, according to the time difference between the pulse leaving the Lidar device and the return pulse received by the sensor. By projecting one or more narrow laser beams in a multiplicity of directions, for example by the beam emitter being rotated around an axis, physical features in the environment may be mapped with high resolutions. In some applications the distances to the nearest object in a multiplicity of directions around the light source may be determined, thus providing a mapping of the light source environment.

A Lidar device can illuminate the environment in a sphere or part thereof around the device. In other embodiments, a Lidar can illuminate the environment in a circle or part thereof, for example in parallel to the ground.

In further embodiments, a Lidar may comprise two light sources located on a horizontal segment, and may combine a multiplicity, for example 16 active sensing elements that together form a sensor. The returned results may include a value indicating a distance of objects in each of the 16 segments.

The laser source of the device is sometimes a green light having a wavelength such as about 532 nm, or near-infrared light having wavelength 940 nm, 1064 nm, or others.

A Lidar further comprises a sensor for receiving the light, and a computing platform that analyses, collects or stores the data. Analysis may include converting the time-intervals to distances. Some specific Lidars, such as Lidars mounted upon aircrafts may comprise additional components, such as GPS for determining the aircraft's position in terms of latitude, longitude and altitude (x, y, z coordinates), and an Intertial Measurement Unit (IMU) for determining the roll, pitch and yaw (the vertical and horizontal movements) of the aircraft in flight, wherein these measurements are required for correct computation of the distances due to the high speed of the aircraft.

One technical problem dealt with by the disclosed subject matter is the need to provide a driver or another user or system with exact information of the environment, whether the driver can see the environment or not. Of particular importance is the distance between the car and objects in its vicinity. Objects may relate to static objects such as traffic signs, buildings, trees or the like, and also to moving objects such as other cars, humans, animals, or the like. It will be appreciated that most objects to be considered are at the ground level or small elevation above ground level, for example up to 50 cm.

Referring now to FIG. 1, showing a car dash board 100, and a dash cam 104 installed on the windshield and capturing the view substantially as seen by the driver. The captured images, whether still or video may be stored and played a required.

One technical solution relates to a device comprising a Lidar, a multi-spectral camera, a processing unit and optionally a display device. The multi spectral unit is adapted to capture at least some parts of the visible spectrum, as well as the wavelength of the Lidar. The Lidar is placed in the vicinity of the camera, and emits light along a horizontal plane in a range substantially equal to the field of view of the camera, at a level such as between about 10 cm above ground and 1 meter above the ground. Thus, since the camera is adapted to capture the Lidar wavelength, then in addition to capturing the environment, the camera also captures the light emitted by the Lidar and hitting objects in the environment. The lighted points or areas can then be detected by image analysis, and the object present at the location of the light point can be associated and fused with the distance reported by the Lidar. Matching the light point/area with the distance report can be done using the time stamp associated with each such report, which should match the time stamp of a captured frame, or otherwise synchronizing the Lidar and the camera.

The captured image can then be displayed to a user, with an indication of the distance of each identified object, thus utilizing the fused information.

Additionally or alternatively, the fused information can be used for determining commands to be provided to one or more systems of the vehicle, and in particular driving assisting systems, such as the brakes if an object is at a short distance from the car, the engine, or the like.

Figure 2:
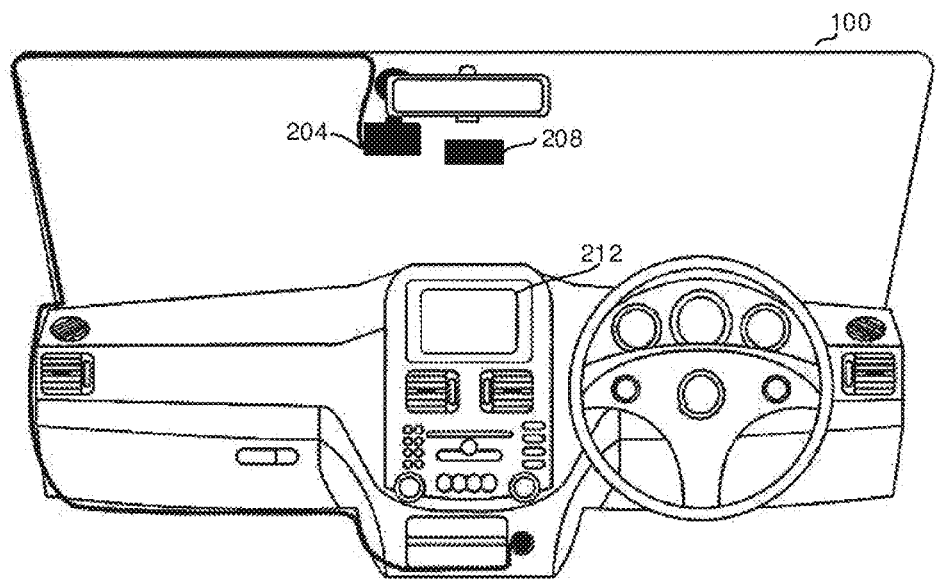
FIG. 2 is a schematic illustration of a car dash board with a dash cam and a Lidar, in accordance with some embodiments of the disclosure.

Referring now to FIG. 2, showing an illustration of a car dash board with a multi-spectral dash cam and a Lidar. Dashboard 100 has installed thereon a multi-spectral camera 204, and a Lidar device 208. Multi-spectral camera 204 captures the environment and the light emitted by Lidar 208 as it hits objects. The captured images are analyzed, and objects appearing in the images are being associated with distances as computed by the Lidar. The images, together with the distance indications can be displayed on any display device, such as display 212, a dedicated display installed on the windshield or the dashboard, or the like.

It will be appreciated that the camera and the Lidar may be installed anywhere in the car and are not limited to being installed on the windshield. Further, a multiplicity of systems such as multiplicity of Lidar and camera sets may be installed at different areas of the car. Thus the apparatus can be used in conjunction with a reverse camera, wherein the captured images together with the distances are displayed whenever the driver drives backwards.

Figure 3:
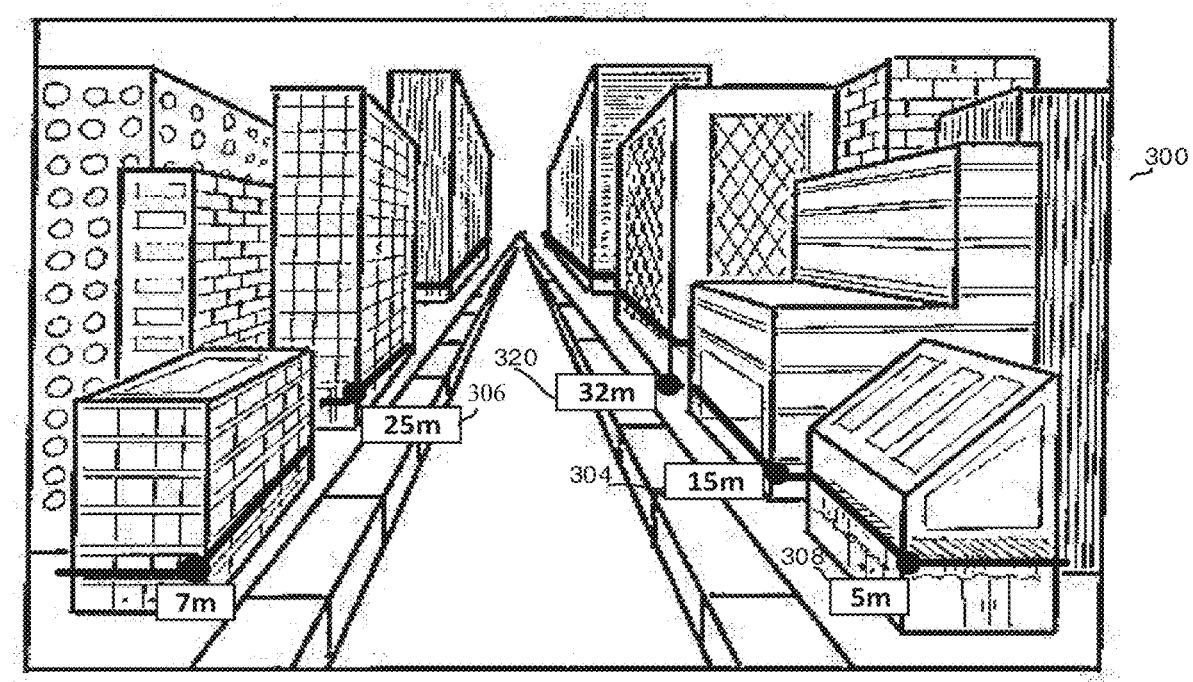
FIG. 3 is a schematic illustration of a view captured by the dash cam and enhanced with information from a Lidar, in accordance with some embodiments of the disclosure.

FIG. 3 shows a schematic illustration of a view 300 as displayed on a display device, comprising images as captured by a multi spectral camera, with the distance indications 304, 306, 308, 320 associated with viewed objects provided by a Lidar having a single light source and scanning horizontally. It will be appreciated that the thick line indicating where the Lidar light hits the objects may be invisible and is thus not displayed to a user. The line is shown in FIG. 3 for explanatory purposes.

A technical effect of the disclosure is the enhancement of images as captured by a camera installed on the dash board or the windshield of a car, with useful information, and in particular the distance between the car and various static or dynamic object in the vicinity of the car.

Another effect of the disclosure is the usage of fused information in determining commands for operating the vehicle, such as by transmitting a command to a critical system. For example, if an object is identified at a distance shorter than a first threshold from the car and the car is advancing in a velocity exceeding a second threshold, a braking command may be generated and sent over a communication channel such as a CANBUS to the relevant system, being the brakes. In another situation the controller may determine and transmit a command to the engine to accelerate, or the like.

Figure 4:
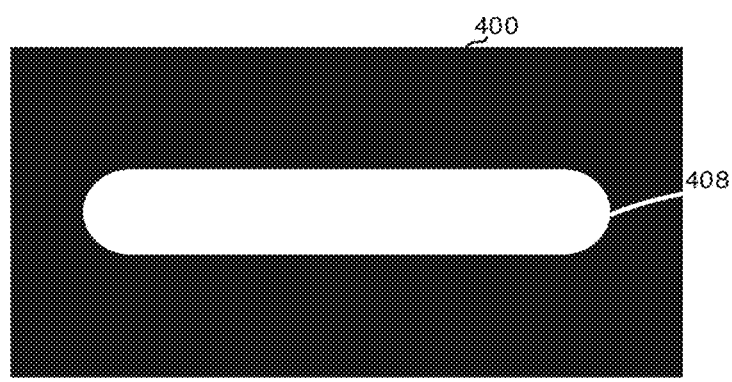
FIG. 4 is a schematic illustration of a view of a beam Lidar image, in accordance with some embodiments of the disclosure.

FIG. 4 shows a schematic illustration of an image 400 captured by a multi spectral camera capturing the light of a 2 light source Lidar hitting a dark wall, including light spot 408.

Figure 5:
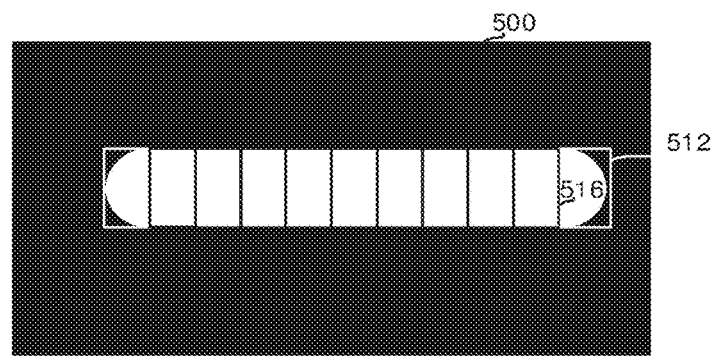
FIG. 5 is a schematic illustration of a view of the beam Lidar image of FIG. 4, with a multiplicity of segments for which data is provided, in accordance with some embodiments of the disclosure.

FIG. 5 shows the same image, in which the sequence of segments, such as 16 segments, for which distances are provided by the Lidar, such as segments 512 and 516 are indicated on light spot 408. It will be appreciated that a distance indication is provided for each such segment.

Figure 6:
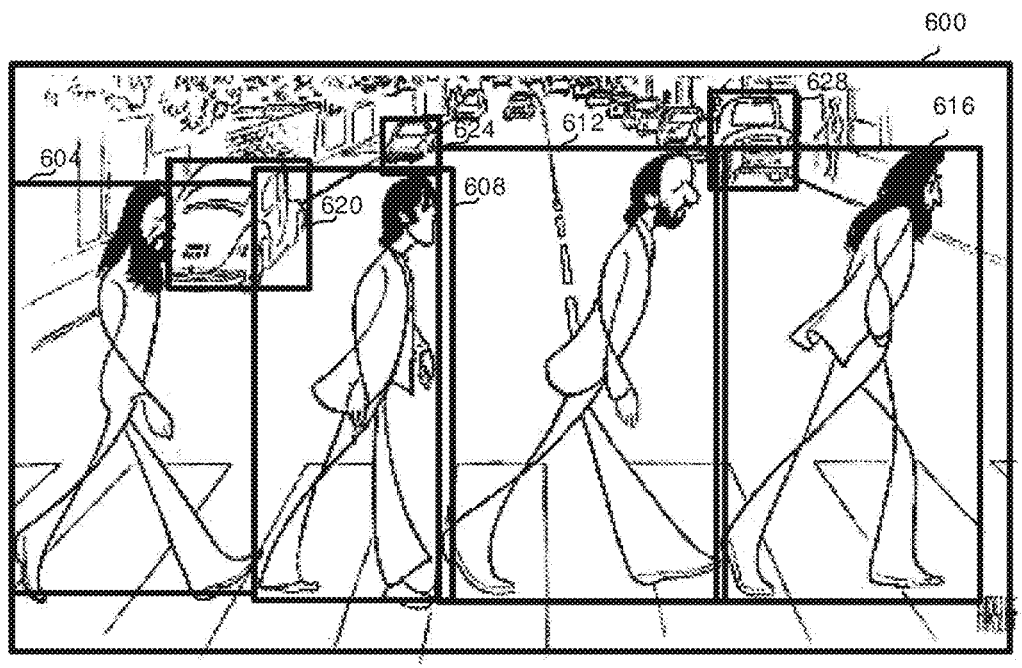
FIG. 6 is a schematic illustration of a view captured by the dash cam with identified objects, in accordance with some embodiments of the disclosure.

FIG. 6 shows an illustration of a captured image 600. The image had been processed by one or more image processing techniques, for recognizing objects within the image, such as persons 604, 608, 612 and 616, cars 620, 624 an d628, or the like.

The objects may be recognized using algorithms such as but not limited to edge detection, object segmentation, histogram of gradient, neural networks or any machine learning or deep learning algorithms.

Figure 7:
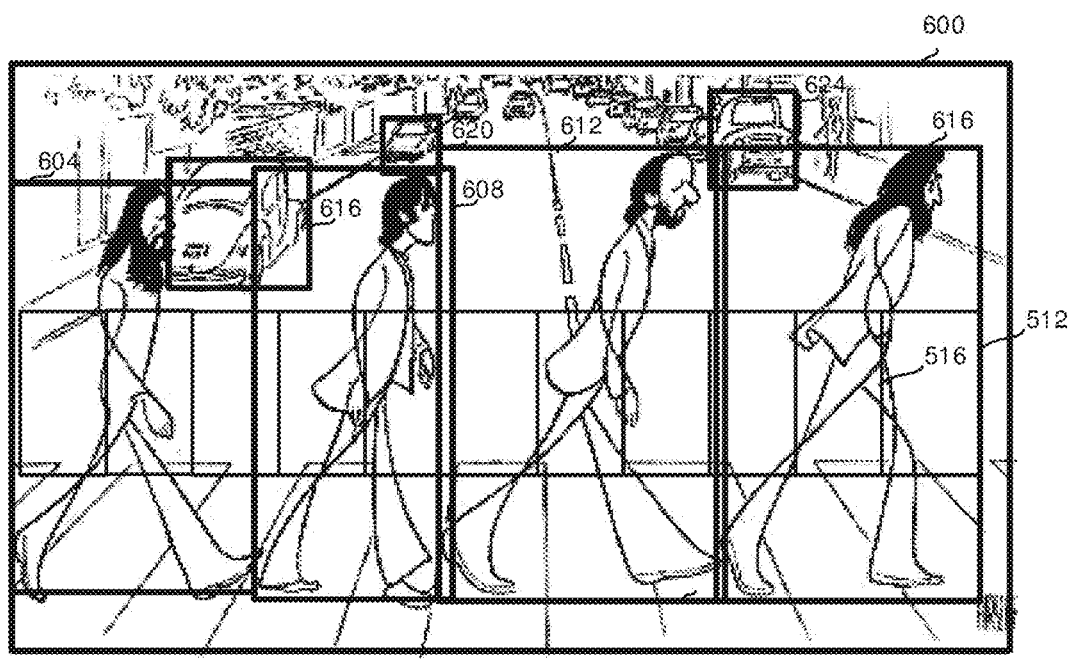
FIG. 7 is a schematic illustration of the view with the identified objects of FIG. 6, and with the segments of FIG. 5, in accordance with some embodiments of the disclosure.

FIG. 7 shows image 600 with the same identified objects, and also with the segments associated with the distances, as shown on FIG. 5. Thus, the distance to an object appearing in the image can be determined in accordance with the distance reported by the Lidar for the one or more segments overlapping with the object. It will be appreciated that if the object partly overlaps with two or more segments, multiple distances may be associated with different areas of the object. In other embodiments, a combined distance, such as an average, may be calculated for the object. The average can be a weighted average taking into account the area of the object within the image that overlaps with each segment. In other embodiments, the distance associated with the object may be the minimal reported distance for any of the segments overlapping with the object. This scheme is useful particularly in applications related to driving, in which the nearest area of an object is relevant for a driver approaching the object.

Figure 8:
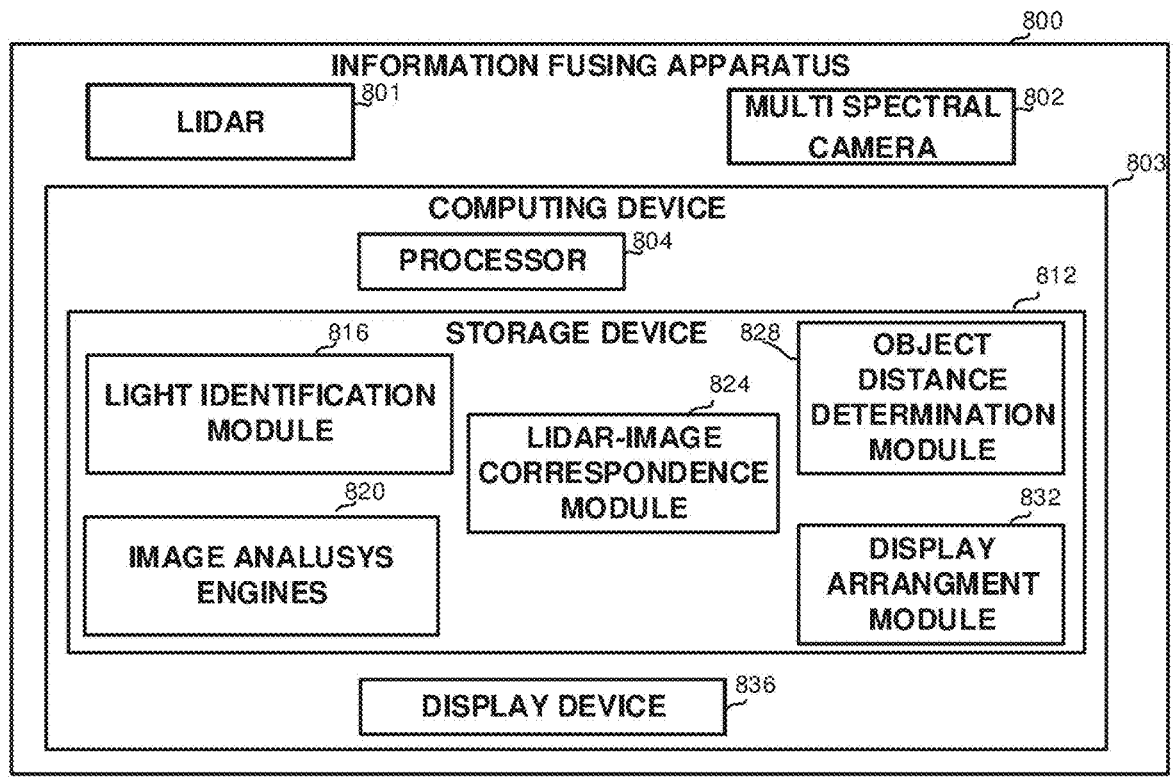
FIG. 8 is a schematic block diagram of an apparatus for combining an image captured by a multi spectral camera with additional information, in accordance with some embodiments of the disclosure.

Referring now to FIG. 8, showing a schematic block diagram of an information fusing apparatus for a vehicle, in accordance with some embodiments of the disclosure.

It will be appreciated that in addition to the components detailed below, a vehicle in which the apparatus is installed may comprise also the following components that can interface or use the apparatus.

Thus, the vehicle can comprise ADAS for carrying out activities related to operating the car, such as braking or steering. ADAS 805 can be responsible for all the driving operations, for example in an autonomous car, or to providing certain features, such as cruise control or others, The vehicle can comprise a communication channel through which components can communicate and send data or commands to each other, such as controller area network operating with the CANBUS protocol. It will be appreciated that other communication channels can be used, for example Ethernet. One or more information fusing apparatuses in accordance with the disclosure can also be connected to the communication channel.

The apparatus may comprise Lidar 801 and multi spectral camera 802, configure to capture at least substantial parts of the visible light, as well as the wavelength emitted by Lidar 801. Lidar 801 may emit near-infrared light having wavelength such as 940 nm, 1064 nm or others.

The apparatus also comprises computing device 803, which may comprise one or more processors 804. Any of processors 804 may be a Central Processing Unit (CPU), a microprocessor, an electronic circuit, an Integrated Circuit (IC) or the like. Alternatively, computing device 803 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 804 may be utilized to perform computations required by apparatus 400 or any of it subcomponents.

Computing device 803 may comprise one or more storage devices 812 for storing executable components, and which may also contain data during execution of one or more components. Storage device 812 may be persistent or volatile. For example, storage device 812 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 812 may retain data structures and program code operative to cause any of processors 804 to perform acts associated with any of the steps shown in FIG. 9 below.

The components detailed below may be implemented as one or more sets of interrelated computer instructions, executed for example by any of processors 804 or by another processor. The components may be arranged as one or more executable files, dynamic libraries, static libraries, methods, functions, services, or the like, programmed in any programming language and under any computing environment.

In some exemplary embodiments of the disclosed subject matter, storage device 812 may comprise light identification module 816 for receiving one or more images captured by multi spectral camera 802, and for identifying therein one or more points or spots associated with the wavelength emitted by Lidar 801.

Storage device 812 can comprise image analysis engines 820 for analyzing the image and performing various algorithms, such as but not limited to edge detection, object detection histogram of gradient, neural networks or any machine learning or deep learning algorithms for identifying objects within the image.

Storage device 812 can comprise Lidar-image correspondence module 824, for associating one or more objects with corresponding one or more Lidar readings, which may be implemented in accordance with the type of Lidar used.

For example, if a single light source Lidar is used, one or more points of light may be detected in an image, and the distance reported for the points may be associated with the object detected in the area of each point.

The correspondence between a point in an image and the reading indicating its distance may be made by synchronizing the camera and the Lidar.

In another embodiment, in which a two light source Lidar is used, a light spot such as shown in FIG. 5 is produced, and a distance is provided for each of a predetermined number of segments. In this embodiment, some of the objects in the image may be associated with one or more readings related to segments overlapping with the objects.

Storage device 812 can comprise object distance determination module 828 for associating a representative distance with an object, based on the obtained one or more readings for the object. If multiple readings are provided for multiple points associated with the object, such as when using a single light source Lidar, the distance of the object may be calculated by combining the distances, for example by averaging. If a Lidar with multiple light sources is used, the distance to an object appearing in the image can be determined in accordance with the distance reported by the Lidar for the one or more segments overlapping with the object. For example, a combined distance, such as an average may be calculated for the object. The average can be a weighted average taking into account the area of the object within the image that overlaps with each segment. In other embodiments, the distance associated with the object may be the minimal reported distance for any of the points or the segments overlapping with the object.

Storage device 812 can comprise display arrangement module 832, for arranging the display of the image and the distances, if images fused with additional information are to be displayed. It will be appreciated that although the light point or spots emitted by the Lidar are captured by the camera, they may or may not be displayed in the image. In order to display them, the light points, which may be invisible to humans, may be assigned a specific color in the displayed image.

Display arrangement module 832 may be operative in determining whether a distance to an object need be displayed: for example, a faraway building may be irrelevant for a driver, and displaying its distance may only clutter the display. For other objects, it may be determined where on or near the object its distance is to be displayed, such that it is seen as clearly as possible, and correctly represents a distance to the object. For example, if the image shows a very large building, it may be material which part of the building the distance relates to.

Display arrangement module 832 may also be responsible for determining, the refresh rate of the image or the distance indications, such that it does not exceed a predetermined threshold, in order for a user, and in particular a driver be able to easily grasp the number, which is impossible if changes are too frequent. Since typical scanning speed by the Lidar can be in the order of magnitude of 200 rounds per minute, the changes in the distances of objects between consecutive rounds of the Lidar is not significant, thus it may not be necessary to update the distance during each round of the Lidar.

Display arrangement module 832 can also be operative in displaying distances not only to the object for which distances are available in the last captured image, but also to other objects in the field of view, for which the distance has been determined in a previous frames. This may be particularly useful with a single source Lidar, in which each image may show only light points in certain areas of the image It will be appreciated that different distances may be displayed with different colors or other characteristics. For example, distanced under a predetermined threshold such as 10 meters can be colored red while farther objects can be colored green. Moreover, if an object within the image is closer than a predetermined threshold, a vocal indication may also be provided.

In some embodiments, apparatus 800 may comprise a display device 836 for displaying the image and the distances to a driver. Display device 432 can be a dedicated display device or any other display device available within the car.

Figure 9:
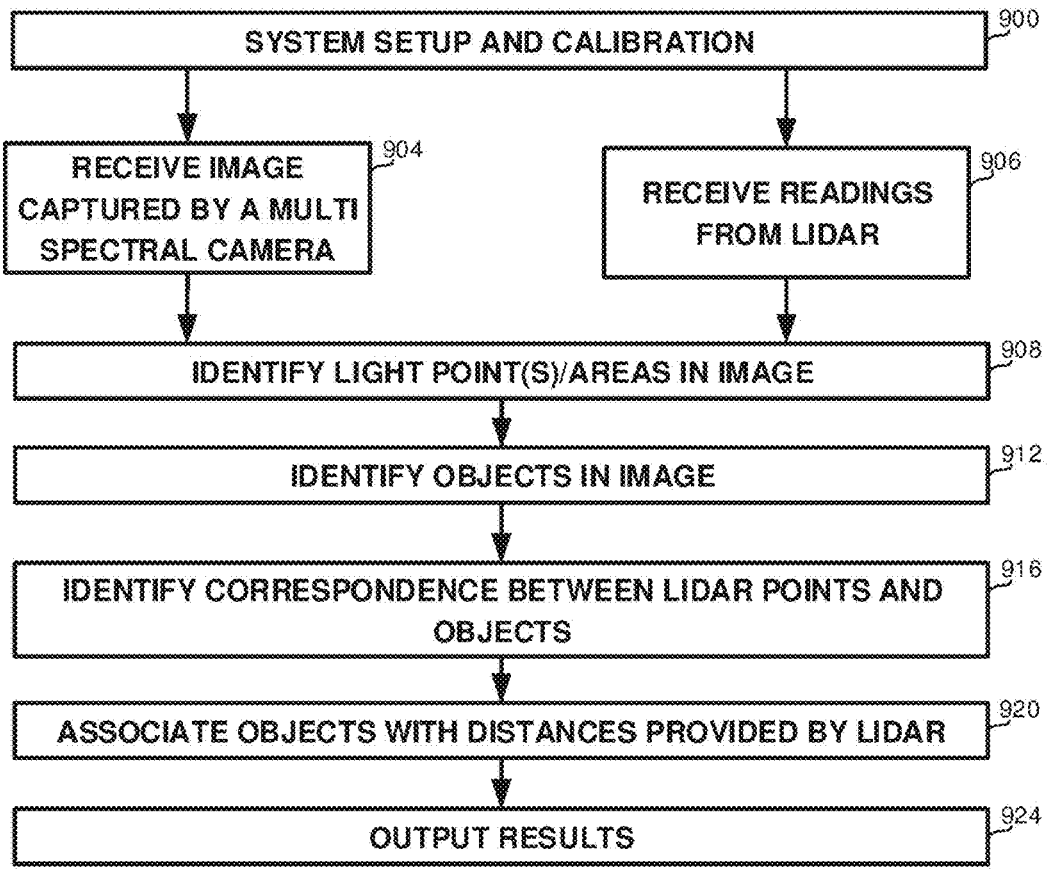
FIG. 9 is a schematic flowchart of a method for combining an image captured by a multi spectral camera with additional information, in accordance with some embodiments of the disclosure.

Referring now to FIG. 9, showing a flowchart of a method for displaying captured view with additional information, in accordance with some embodiments of the disclosure.

On step 900, system setup and calibration may be performed. Setup may include synchronizing Lidar 801 and camera 802. Setup may also include calibrating the Lidar and the camera, such that the peak reflection amplitude of the Lidar is in the center of the image or in another known part of the image, mapping the segments for which distances are provided by the Lidar to areas of the frame, and calibrating the wavelengths captured by the camera such that the wavelength of the Lidar is captured or the like.

On step 904, one or more images captured by multi spectral camera 802 may be received.

On step 906, which may be performed before, after or in parallel to step 904, one or more readings related to one or more directions or areas are received from Lidar 801.

On step 908, one or more points, spots or areas may be identified by light identification module 816 within the received image, which points have a pixel value associated with the wavelength of the Lidar. This is particularly useful using a single source Lidar. In embodiments in which a light spot is created the area associated with the peak reflection amplitude of the Lidar is identified.

On step 912, one or more objects such as humans, pets, cars, buildings or others may be identified within a captured image, for example by object manipulation module 820.

On step 916, correspondence may be identified by Lidar-image correspondence module 824 between Lidar points identified within the image on step 908 and objects identified on step 912. The correspondence may be performed using time synchronization, and the calibration performed on setup step 900.

On step 920, one or more distances as provided by Lidar 801 for each point or segment may be associated with one or more objects, in accordance with the correspondence determined on step 916. The association can be performed, for example, by object distance determination module 828.

On step 924 the results, comprising fusion of one or more objects and distances to the objects may be output. In some embodiments the results may be displayed over a display device. In such embodiments, a visual display may be designed, comprising distances to which objects are to be displayed, where on a displayed image distances are to be displayed, with what color or other graphic characteristics, at what refresh rate, or the like.

Additionally or alternatively, the results may be provided, for example via CANBUS to a controller which may use the results to generate one or more commands for operating the vehicle. For example, if an object such as a human, a building or a stop sign is present at distance shorter than a first threshold from the car and the car is advancing in a velocity exceeding a second threshold, a braking command may be generated and sent over the communication channel such as a CANBUS to the relevant system, being the brakes. In another situation the controller may determine and transmit a command to the engine to accelerate, to an alert generation system, or the like. It will be appreciated that if a system in accordance with the disclosure is used I other environments, such as security, commands to other units can be transmitted, For example, in a system protecting an area, an alert nay be sent when a person is approaching the fence, including the distance of the person from the fence.

Generally, closer objects can be given higher priority such that distances to such objects are indicated while distances to farther objects can be omitted. However, other prioritization can be made. For example certain types of objects, such as humans or stop signs can be preferred and distances to such objects may be indicated even if closer objects are identified.

An apparatus in accordance with the disclosure may be combined with additional sensors or additional processing systems, such as but not limited to microphones and audio analysis systems, or others. The data collected from multiplicity of sensors and processed by multiplicity of systems may be fused in order to further enhance data provided to a user or to controllers adapted for determining commands and sending the commands to driving assisting systems.

It will be appreciated that the disclosed method and apparatus are not limited to being used in cars, rather they may be used in other environments such as airplanes, Internet of Things (IoT) devices, infrastructure facilities, homeland security or other security systems, military use, or any other application in which identification and distance can be combined.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for fusing information, to be performed by a device comprising a processor and a memory device, the method comprising:
   receiving at least one distance reading related to the environment from a Lidar device emitting light in a predetermined wavelength;
   receiving an image captured by a multi spectra camera, the multi spectra camera being sensitive at least to visible light and to the predetermined wavelength;
   identifying within the image points or areas having the predetermined wavelength;
   identifying at least one object within the image;
   identifying correspondence between at least one of the points or areas and the at least one reading;
   associating the at least one object with a distance, based on the at least one reading and points or areas within the at least one object, wherein associating the at least one object with a distance comprises associating the at least one object with a distance selected from a multiplicity of distances received from the Lidar, and wherein the distance is selected as an average of the multiplicity of distances; and
   outputting indication of the at least one object and the distance associated with the at least one object.

2. The method of claim 1, further comprising designing a display displaying the at least object and the distance, wherein said outputting comprises displaying on a display device.

3. The method of claim 2, further comprising displaying the image and the distance associated with the at least one object, wherein the distance is displayed in the vicinity of the object on the display device.

4. The method of claim 2, wherein designing comprises determining objects of the at least one object for which a distance is to be displayed.

5. The method of claim 2, wherein designing comprises determining graphic characteristics for the display.

6. The method of claim 1, wherein the method further comprising determining a command to be provided to a system, based on the at least one object and distance.

7. The method of claim 6, wherein the method is implemented within a vehicle and wherein the command is provided to a critical system of the vehicle.

8. The method of claim 1, wherein the distance is selected as a minimal distance from the multiplicity of distances.

9. An apparatus for fusing information of an environment, the apparatus comprising:
- a Lidar device emitting light in a predetermined wavelength; a multi spectra camera, the multi spectra camera being sensitive at least to visible light and to the predetermined wavelength; and
- a processor adapted to perform the steps of:
    - receiving at least one distance reading related to the environment from the Lidar device;
    - receiving an image captured by the multi spectra camera;
    - identifying within the image points or areas having the predetermined wavelength;
    - identifying at least one object within the image;
    - identifying correspondence between at least one of the points or areas and the at least one distance reading;
    - associating the at least one object with a distance, based on the at least one reading and points or areas within the at least one object, wherein associating the at least one object with a distance comprises associating the at least one object with a distance selected from a multiplicity of distances received from the Lidar, and wherein the distance is selected as an average of the multiplicity of distances; and
    - outputting indication of the at least one object and the distance associated with the at least one object.

10. The apparatus of claim 9, further comprising a display device for displaying the at least one image with the distance.

11. The apparatus of claim 10, wherein the processor is further adapted to design a display of the at least one image with the distance to be displayed on the display device.

12. The apparatus of claim 9, wherein the apparatus is within a vehicle, and the vehicle further comprises a controller for receiving the at least one object and the distance and determining a command to be provided to a system within the vehicle, based on the at least one object and distance.

13. The apparatus of claim 12, wherein the at least one object and the distance are provided to the system over CANBUS.

14. The apparatus of claim 12, wherein the command is provided to a critical system of the vehicle.

15. The apparatus of claim 9, wherein the Lidar device emits light in a near infrared wavelength.

16. The apparatus of claim 9, wherein the Lidar device comprises a single light source creating light points on the image.

17. The apparatus of claim 9, wherein the Lidar device comprises two light sources, creating light spots on the image.

18. A computer program product comprising a non-transitory computer readable storage medium retaining program instructions configured to cause a processor to perform actions, which program instructions implement:
- receiving at least one distance reading related to the environment from a Lidar device emitting light in a predetermined wavelength; receiving an image captured by a multi spectra camera, the multi spectra camera being sensitive at least to visible light and to the predetermined wavelength;
- identifying within the image points or areas having the predetermined wavelength;
- identifying at least one object within the image;
- identifying correspondence between each of the points or areas and the at least one reading;
- associating the at least one object with a distance, based on the at least one reading and points or areas within the at least one object, wherein associating the at least one object with a distance comprises associating the at least one object with a distance selected from a multiplicity of distances received from the Lidar, and wherein the distance is selected as an average of the multiplicity of distances; and
- outputting the at least one object and the distance associated with the at least one object.

* * * * *